US005250974A

United States Patent [19]

Iwasaki et al.

[11] Patent Number: 5,250,974

[45] Date of Patent: Oct. 5, 1993

[54] APPARATUS FOR SUPPLYING A FILM FOR USE IN AN AUTOMATIC DEVELOPING MACHINE

[75] Inventors: Hideo Iwasaki; Takeo Ohtomo, both of Tokyo, Japan

[73] Assignee: Fuji Photo Film Co., Ltd., Kanagawa, Japan

[21] Appl. No.: 730,429

[22] Filed: Jul. 16, 1991

[30] Foreign Application Priority Data

Jul. 20, 1990 [JP] Japan ................................ 2-192077

[51] Int. Cl.[5] ................................................ G03B 3/08

[52] U.S. Cl. .................................................... 354/319

[58] Field of Search ................ 354/297, 298, 317-324; 355/27-29, 69, 77; 363/63, 74; 323/242, 234; 83/203, 205, 208, 241, 242, 359, 369, 364

[56] References Cited

U.S. PATENT DOCUMENTS 3,947,856 3/1976 Stievenart et al. ............ 354/319 X 4,791,443 12/1988 Foley et al. ........................ 354/321

4,843,412 6/1989 Uchiyama et al. ............ 354/319 X

FOREIGN PATENT DOCUMENTS 122941 8/1985 Japan .

*Primary Examiner*—D. Rutledge

*Attorney, Agent, or Firm*—Sughrue, Mion, Zinn, Macpeak & Seas

[57] ABSTRACT

An apparatus for supplying a film for use in an automatic developing machine wherein a film stored within a cartridge is withdrawn and supplied to an automatic developing machine, which automatically conveys the film for processing by a power supply from a power source, comprises a device for actuating the cutter by a power supply from the power source to cut the trailing end of the film and a switching device for switching the power supply to the actuating device from the power source to the capacitor. In consequence, when the power supply is interrupted, the cutter is actuated by the electric power from the capacitor.

20 Claims, 7 Drawing Sheets

APPARATUS FOR SUPPLYING A FILM FOR USE IN AN AUTOMATIC DEVELOPING MACHINE

BACKGROUND OF THE INVENTION

1. Field of the Invention

The present invention relates to an apparatus for supplying a film for use in an automatic developing machine, in which a film stored within a cartridge is withdrawn and supplied to an automatic developing machine, which automatically conveys the film for processing by a power supply from a utility power supply circuit.

2. Description of the Related Art

In an automatic developing machine, a cartridge is charged into position and the distal end of a film, which is withdrawn from this cartridge, is adhered to a leader. A plurality of perforations are provided in the leader at predetermined intervals. These perforations are conveyed engage a sprocket so that the film may be sequentially withdrawn from the cartridge for conveying.

The leader and the film are sequentially immersed into a developing tank, fixing tank, rinsing tank and the like respectively and then withdrawn after being dried in a drying chamber. Here, the trailing end of the film wound in layers in the cartridge is adhered to a take-up shaft (spool) within the cartridge. As a result, the film is tensioned immediately before being withdrawn from the cartridge. In the automatic developing machine, this tension is sensed by a sensor such as a limit switch or the like so as to detect the trailing end of the film for actuating a cutter so that a neighboring portion of the trailing end of the film may be cut.

Incidentally, the power supply for the above-described automatic developing machine comes from an electric power company, as in general homes. As a result, if a blackout occurs, the driving system stops and the film remains immersed within each treating tank. In such a case, the film is conveyed and withdrawn using a manual handle. However, before the trailing end of the film is cut by the cutter, the cutter must also be manually driven, which poses a very complicated task for a single operator.

To this end, a back-up battery is previously loaded within the automatic developing machine to actuate the cutter during a blackout condition.

However, if the dry-cell battery or battery is loaded therein, the machine itself becomes bulky, which is not suitable for a relatively small-size laboratory, such as those used in general photo studios or the like. In addition, maintaining distilled water within the battery becomes necessary thus complicating maintainability. In addition, the dry-cell battery or battery needs to be periodically changed regardless of whether it has been used or not, thus resulting in high maintenance costs.

In addition, when the dry-cell battery or battery is loaded. it is necessary to remove wiring for them so that the operator does not suffer an electric shock during maintenance.

In view of the above-described circumstances, an object of the present invention is to provide an apparatus for supplying a film used for the automatic developing machine, which is economical and allows improved maintainability to be improved without making the overall apparatus bulky.

A further object of the present invention is to provide an apparatus for supplying a film used in an automatic developing machine, which negates accidents such as an electrical shock during the maintenance.

SUMMARY OF THE INVENTION

According to the present invention, there is provided an apparatus, actuated by a power supply for supplying a film used in an automatic developing machine, which withdraws and conveys film stored within a cartridge to the automatic developing machine. The developing machine then automatically processes the film comprising:

a cutter means actuated by a power supply, for cutting the trailing end of the film as the trailing end of the film is detected;

an electric charger circuit including a capacitor charged by a power supply from the power source; and a switching means for switching the power supply from the cutter means to the capacitor when the supply of power is interrupted.

In this case, when the trailing end of a film withdrawn from the cartridge is detected, the cutter means is actuated by the power supply to cut the trailing end to be separated from the cartridge. The film separated from the cartridge is automatically coveyed to the automatic developing machine for processing. Meanwhile, the capacitor is being charged by the power supply while the automatic developing machine is operating. When the power supply is interrupted, the power supply to the cutter means is switched from the power source to the electrically charged capacitor and the electric power charged to the capacitor is supplied to the cutter means with the result that the trailing end of the film is cut and separated from the cartridge.

Figure 1A:
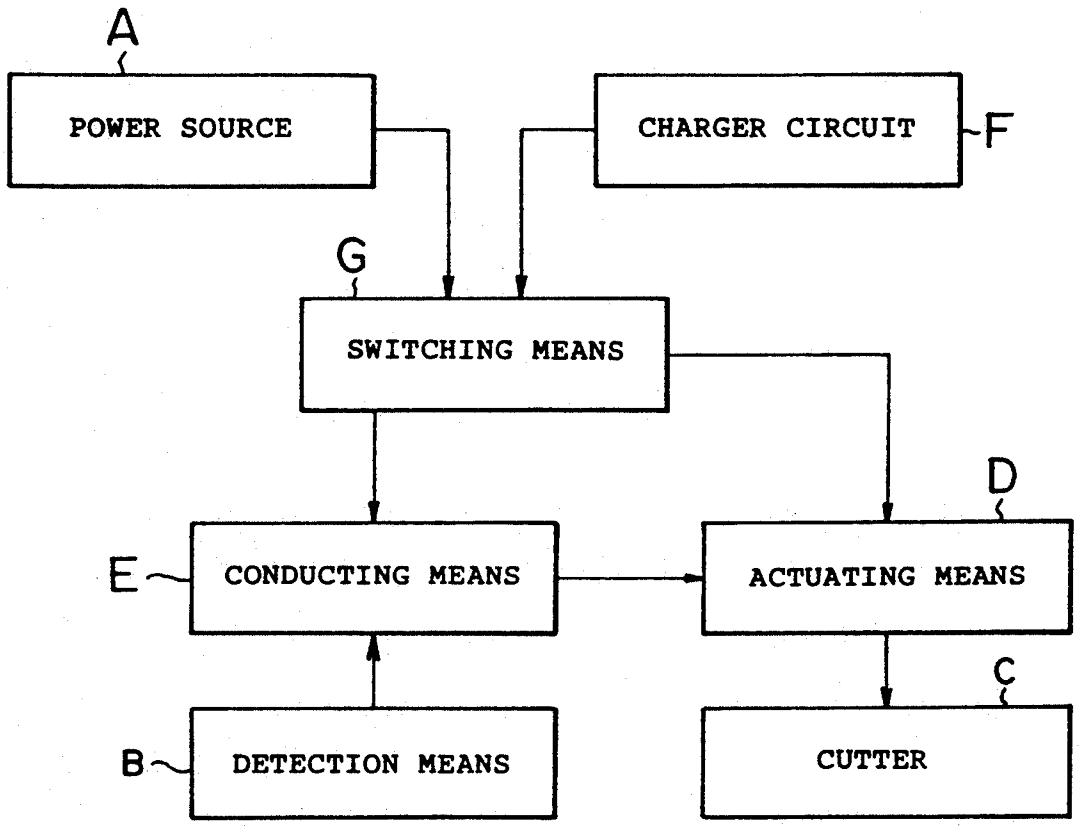
FIGS. 1A and 1B are respectively schematic arrangement views corresponding to embodiments of the present invention.
Figure 1B:
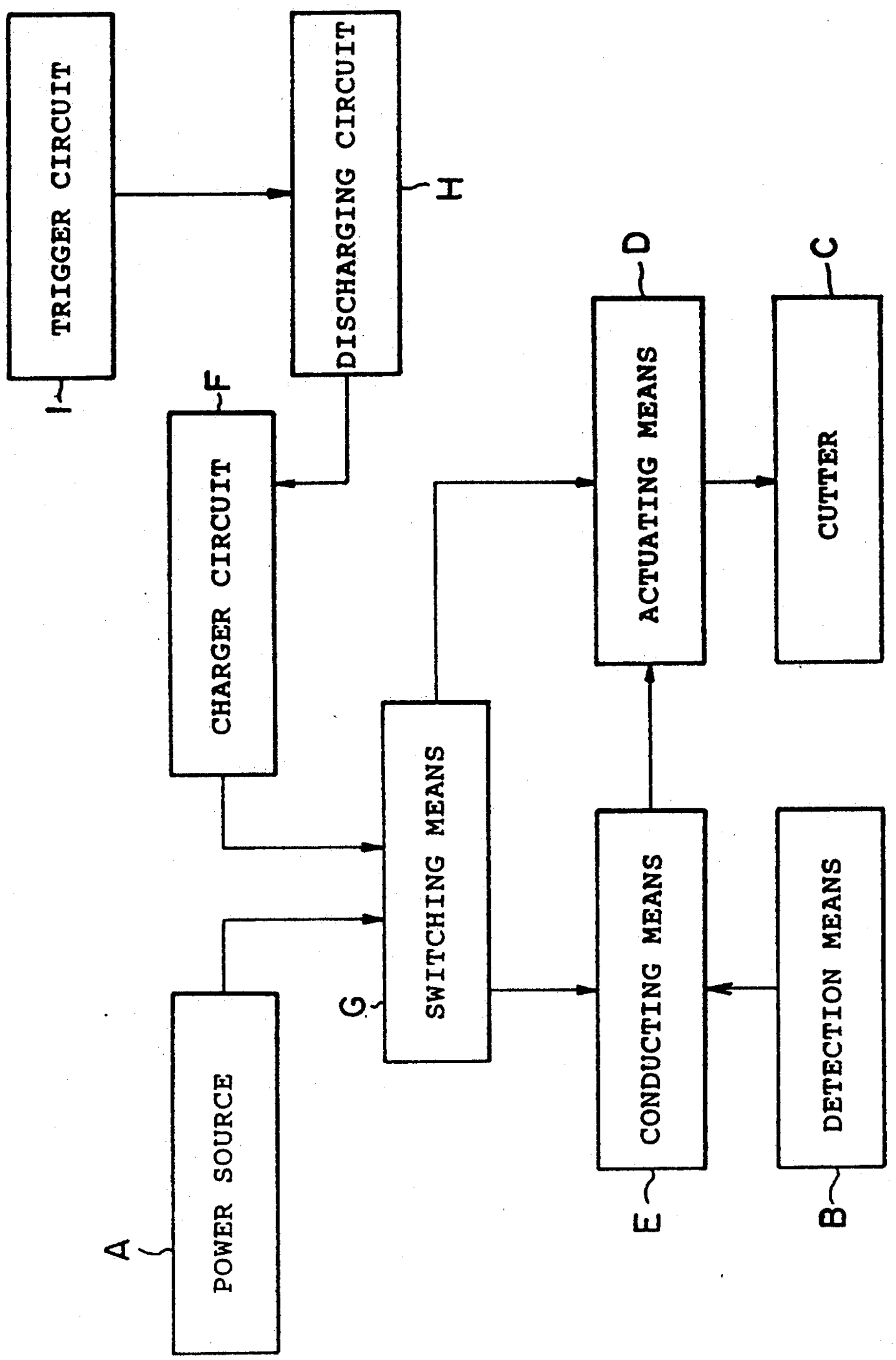

In one embodiment of the present invention, as shown in FIG. 1A, the apparatus for supplying film, which withdraws the film stored within the cartridge to supply into the automatic developing machine treats the film automatically by conveying by a power supply from a power source A, comprises a sensor means B for sensing the trailing end of the film, an actuator means for actuating a cutter C for cutting the film, an electrically conducting means E for actuating the actuating means D by the power supply at the moment the trailing end of the film is sensed by the sensor means B, a charger circuit F having a capacitor electrically charged by power supply from the power source A and a switching means for switching the power supply to the electrical conducting means E from the power source A to the charger circuit means F as the power supply A is interrupted.

According to the above-described embodiment, when power supply A is supplying electric power, the capacitor of the charger circuit F is being electrically charged. When the power source from power supply is interrupted due to, for example, a blackout or the like, the switching means G is actuated and the power supply to the electrically conductive means E is switched from power source A to the capacitor of the charger circuit F. As a result, when the trailing end of the film is sensed by the sensor means B, the power supply is switched from the capacitor of the charger circuit F to the electrically conductive means. Therefore, as usual, the cutter C is actuated as when power is supplied from power source A to the electrically conductive means E.

Another embodiment of the present invention provides an electric discharger circuit H for discharging electric power charged to the capacitor of the charger circuit F and a trigger portion I for triggering the discharger circuit under a predetermined condition.

According to this embodiment, when the predetermined condition is met, the electric power charged to the capacitor is discharged by triggering the discharge circuit H by the trigger portion I.

In this case, if the trigger of the trigger portion I is set to be a signal emitted from an open/close sensor for sensing an open lid during maintaining the automatic developing machine, there is no danger of electric shock taking place while the operator is working on the charger circuit.

In addition, if the trigger of the trigger portion I is assumed to be an output signal of a sensor for sensing open/closed condition of a lid member provided on a cover which covers the charger circuit, then the electric power charged to the capacitor can be discharged only when maintenance of the neighboring portion of the charger circuit is performed, to reduce the charging times.

In addition, the trigger of the trigger portion I may be a signal emitted by operating a manually operable operating portion, which allows the operator to determine whether discharging is needed or not.

As seen from above, the apparatus according to the present invention has an excellent effect in that maintainability can be economically improved without using a dry-cell battery or battery, which is costly and inconvenient for maintenance.

In addition, from viewpoint of safety, it also has another excellent advantage in that no accident such as the electric shock will occur during maintenance.

DESCRIPTION OF THE PREFERRED EMBODIMENTS

Figure 2:
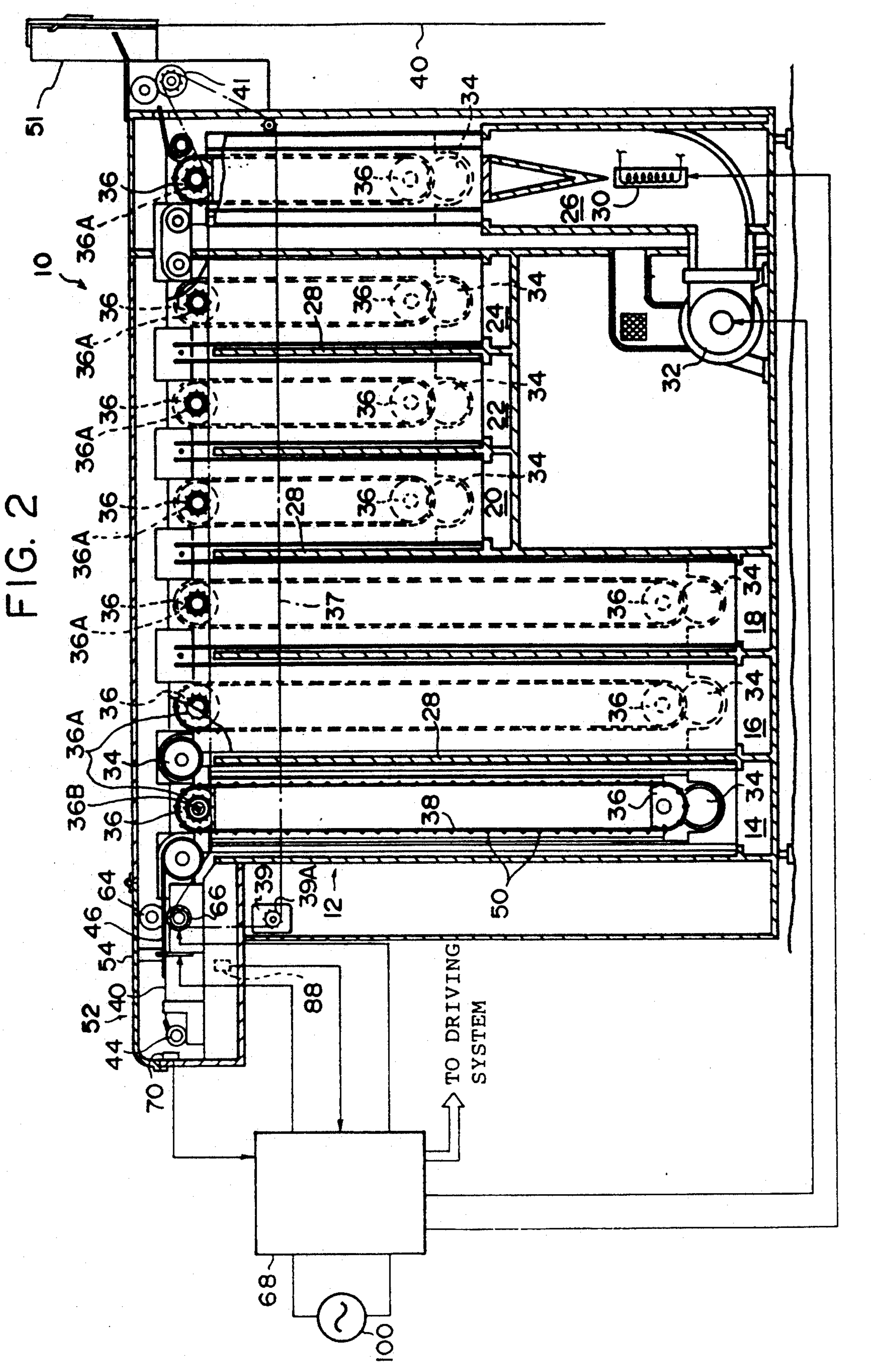
FIG. 2 is a schematic arrangement view of an automatic developing machine according to the present invention.

In FIG. 2, an automatic developing machine 10 according to the present invention is illustrated. In this automatic developing machine 10, its outside is covered with a frame 12 so that external light is prevented from entering.

Within the frame 12, a plurality of tanks 14, 16, 18, 20, 22, 24 and 26, each extending in the vertical direction. The tanks 14, 16, 18, 20, 26 are in a line and partitioned by vertical walls 28. A developing solution is stored within tank 14, a bleaching solution within tank 16, a fixing solution within tank 18, rinsing solutions within tanks 20 and 22 and a stabilizing solution within the tank 24, respectively. A heater 30 and a fan 32 are disposed below tank 26 so that hot wind may be upwardly fed.

In addition, guide rollers 34 are provided below each tank 14 to 26 and on the boundary wall between each two tanks. Further, sprockets 36 are provided above and below each tank 14 to 26 and an endless belt 38 and stretched between and around the upper and lower sprockets 36 (only the sprocket for the tank 14 is shown). A gear 36A is mounted to the rotating shaft of each upper sprocket 36 and a chain 37 is integrally tensioned in its lateral direction. In addition, this chain 37 is wound about a conveying roller 66 (described later) and a conveying roller 41 at the lowermost downstream side of the apparatus. In addition, this chain 37 is wound round a gear 39A mounted to the rotating shaft of a motor 39 disposed on the end portion of the left side as seen as FIG. 2 so that, by driving this motor 39, the chain 37 is driven. In consequence, when the motor 39 is driven, its driving force is transmitted from the chain 37 through sprocket 36 to belt 38.

In addition, provided on the shaft of sprocket 36 lying to the leftmost side as seen in FIG. 2, that is, the sprocket 36 provided in developing tank 14, is a rectangular hole 36B, into which a handle (not shown) can be engaged. In consequence, when the handle engages this rectangular hole 36B and is operated, the chain 37 can be manually driven.

Figure 3:
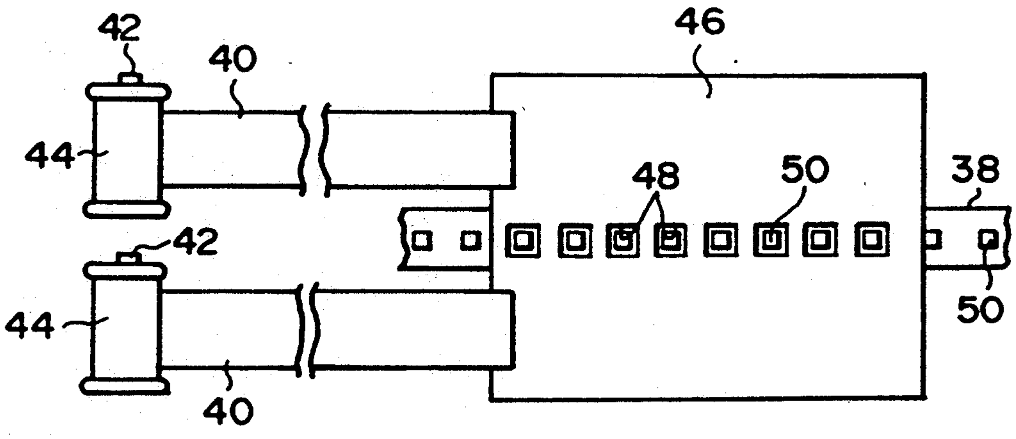
FIG. 3 is a plan view illustrating how a leader and a film are coupled.

As shown in FIG. 3, the film 40 is wound around spool 42 and stored within the cartridge 44. In this embodiment, the distal ends of two films 40 withdrawn from the spools 42 are fixedly adhered to a single leader 46 via an adhesion means such as an adhesive tape 47 or the like. The leader 46 is made of a flexible synthetic resin sheet, which is somewhat rigid as compared with the film 40, and has a plurality of angular perforations 48 running in the longitudinal direction at its central portion. As a result, when these angular perforations 48 engage a plurality of protrusions 50 provided on the external surface of the belt 38, the two films 40 are simultaneously conveyed.

In consequence, the leader 46 and film 40, which are delivered out from a film supply means 52 (described later), pass through each tank 14 to 26 along a path as illustrated by a dashed line shown in FIG. 2. Although not shown in detail, each film 40 coupled to the leader 46 is sequentially suspended against a hook on a film accumulation unit 51.

Figure 4:
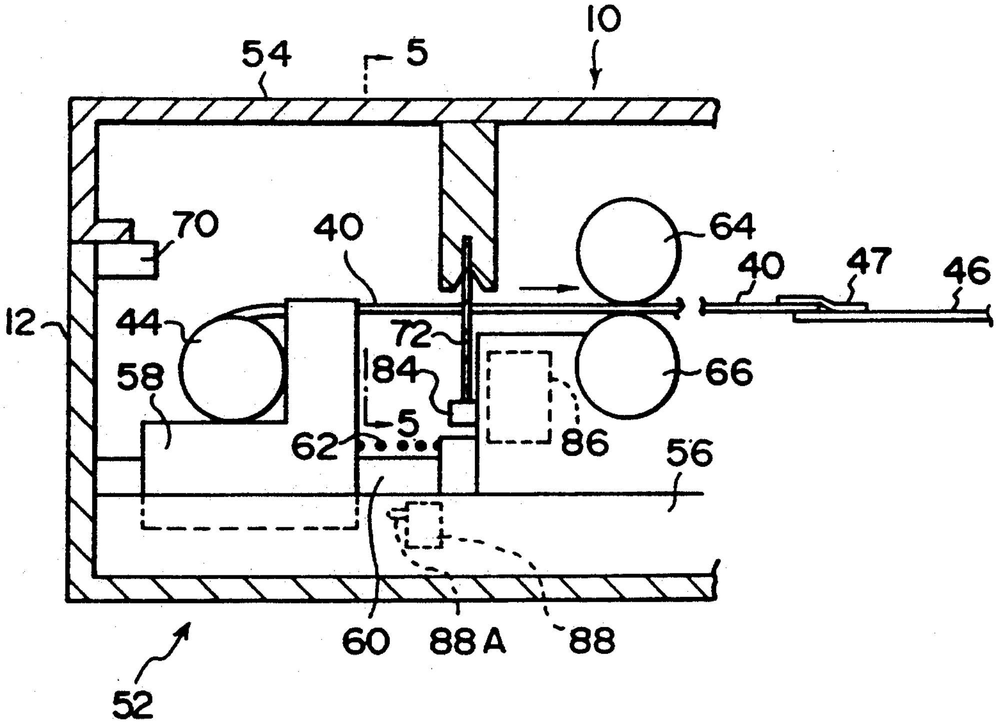
FIG. 4 is a lateral cross-sectional view of a film supply means.

The film supply means 52 is disposed at the inlet side (leftward side as viewed in FIG. 2) upwardly from the film 12, and its upper surface is covered with an open- and closable cover 54. As shown in FIG. 4, a base plate 56 extends in the conveying direction of the film 40 within the frame 12 and an angular film bearer 58 is disposed on the baseplate 56. This bearer 58 is slidable along a rail 60 laid in the conveying direction of the film 40, and is usually energized in the direction opposite (leftward as viewed in FIG. 4) to the film conveying direction, by means of a compression coil spring 62. In consequence, if each cartridge 44 is placed on the bearer 58 with the distal ends of two films 40 coupled to the leader 46, and the leader 46 is inserted between the conveying rollers 64 and 66, then each film 40 will be simultaneously conveyed in the direction of the arrow. The upper conveying roller 64 is axially supported at the cover 54 side, and when the cover 54 is opened, both conveying rollers 64, 66 separate from each other. In addition, a limit switch 70 connected to a control unit 68 (see FIG. 2) is mounted at the opening position closed by the cover 54 to detect the open and closed conditions of the cover 54. In this case, when the cover 54 is opened, the limit switch 70 is turned OFF.

Figure 5:
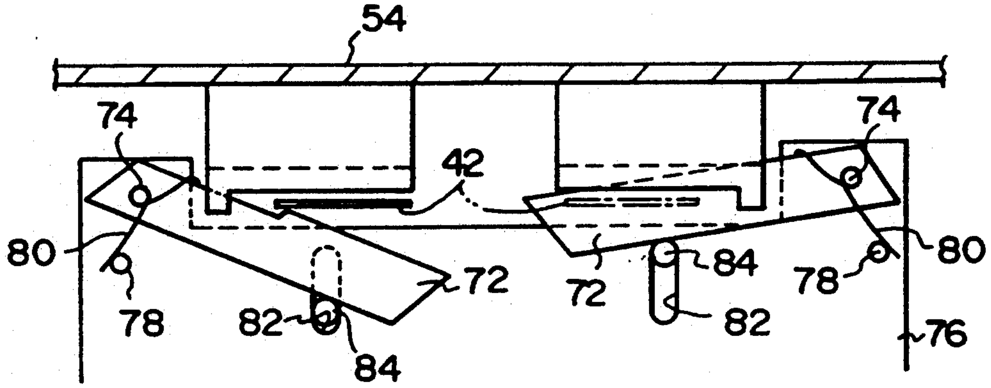
FIG. 5 is a cross-sectional view taken along line 5—5 of FIG. 4.

A thin blade cutter 72 is disposed between the bearer 58 and the conveying rollers 64, 66 respectively and, as shown in FIG. 5, the proximal end portion of this cutter 72 is axially supported to a supporting base 76 via a pin 74. In addition, a pin 78 is embedded into the external surface of the supporting base 76 and a torsion coil spring 80 is provided between the cutter 72 and the pin 78 so that the cutter 72 is urged in the lower direction of FIG. 5 (in the direction opposite to the film cutting direction) by this spring 80.

A drive pin 84 protruding from an elongated hole 82 of the supporting base 76 abuts the lower surface of the distal end of the cutter 72. This drive pin 84 is vertically moved within the elongated hole 82 by a solenoid 86 (see FIG. 4) disposed within the supporting base 76. The solenoid 86 is connected to the control unit 68. In this case, when the drive pin 84 is upwardly moved, the cutter 72 is turned in the direction of cutting the film 40 (upwardly as viewed in FIG. 5) against the urging force of the torsion coil spring 80.

Although, for the convenience of description, the left side of FIG. 5 shows the cutters 72 before cutting and the right side of FIG. 5 shows the same after cutting. If the lengths of both films are the same, both cutters 72 are simultaneously driven.

As shown in FIG. 4, a limit switch 88 is disposed on the baseplate 56 and its contact 88A faces the front end surface of the supporting base 58. This limit switch 88 is connected to the control unit 68 for setting the timing for the solenoid 86 to be driven. Meanwhile, when all of the films 40 are withdrawn from the cartridge 44, the force of withdrawing the films 40 is transmitted to the bearer 58 via the cartridge and the bearer 58 itself is moved in the conveying direction of the film 40 against the urging of the compression coil spring 62.

Therefore, when withdrawal of the films 40 of the cartridge 44 is completed, the bearer 58 advances so as to press the contact 88A of the limit switch 88 so as to send a high level signal (ON signal) to the control unit 68 for driving the cutter. That is, when completion of withdrawal of the films 40 (the trailing end of the film is reached) is detected by the limit switch 88, the cutter 72 cuts the trailing end of the film 40 off the cartridge 44. The cutoff film 40 is conveyed to each developing line together with the leader 46.

Figure 6:
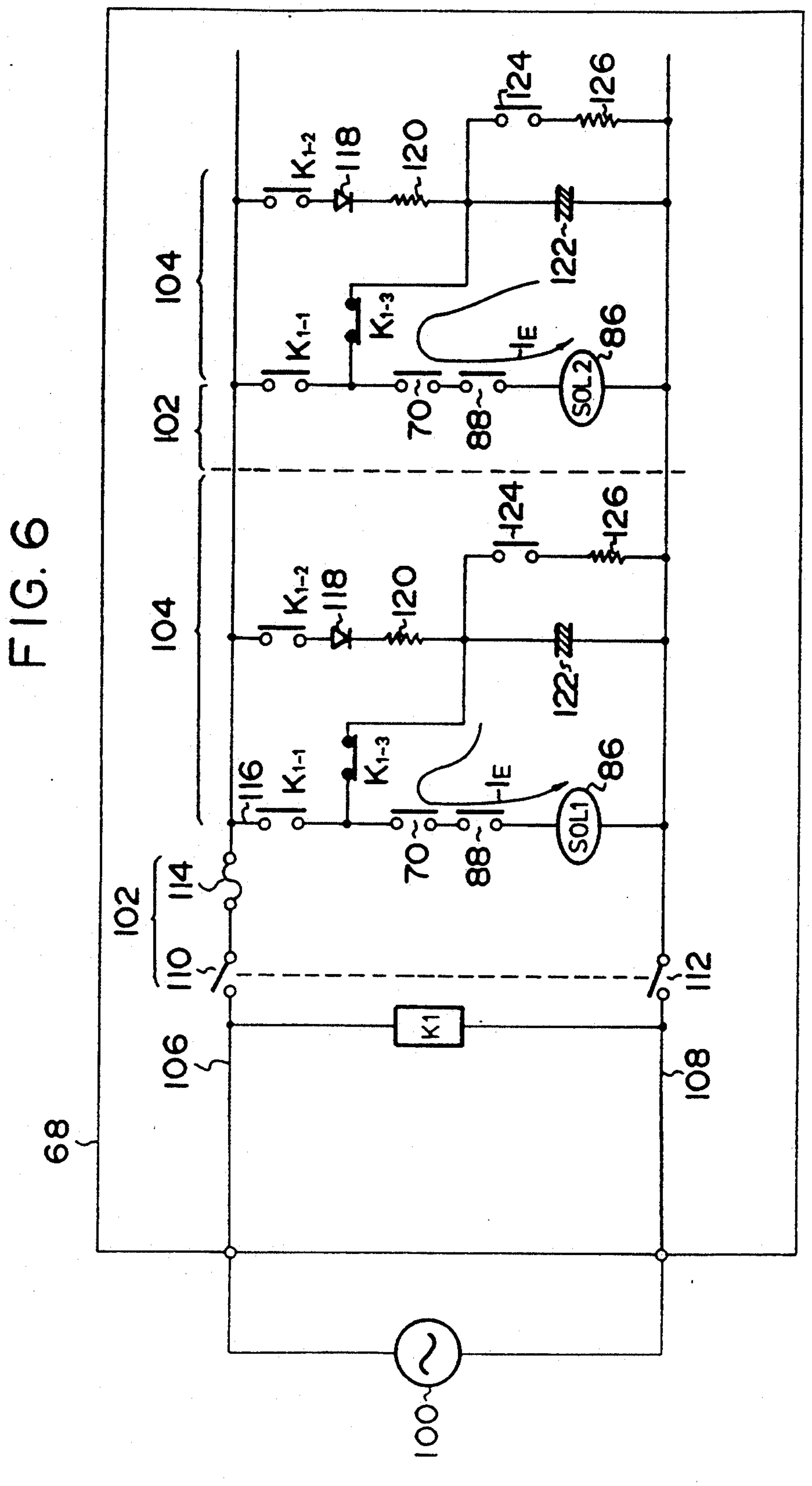
FIG. 6 is a current supply circuit for supplying the cutter with current.

In FIG. 6, a circuit diagram for actuating the cutter 72, which constitutes part of the control unit 68, is illustrated.

The power supply circuit according to the present embodiment for inputting to the control unit 68 is comprised of a utility current supply circuit 102 similar to that for general domestic use, which apples AC 100 V to a power source 100, and a charger circuit 104, which is applied when the utility current supply is interrupted such as in the case of a blackout.

The power source 100 used for the utility current supply is used directly or by changing the voltage from the utility electric power company by a predetermined degree, and both ends of a relay $K_1$ including a relay coil, which forms a switching means, are each connected between either one of the power supply lines 106 and the other power supply line 108. The primary switch of this relay $K_1$ is turned ON when the AC power source 100 is applied, that is, the relay coil of the primary switch is excited and turned OFF when the current supply is interrupted.

With this primary switch turned ON, excitation of the relay coil causes switches $K_{1\text{-}1}$ and $K_{1\text{-}2}$, which are secondary switches, to be turned ON with the result that a switch $K_{1\text{-}3}$ is turned OFF.

The power supply lines 106 and 108 extend with switches 110 and 112 interposed respectively therebetween. These switches 110 and 112 are interlockingly operated serving as a main switch.

One end of the switch 110 of the power line 106 is connected to one end of a fuse 114, the other end of which is branched. A branched line 116 is connected to one end of the above-described secondary side switch $K_{1\text{-}1}$. The other end of the secondary side switch $K_{1\text{-}1}$ is connected to one end of a limit switch 70 provided in the neighborhood of the open portion of a film supply means 10. The other end of the limit switch 70 is connected to one end of a limit switch 88, which is turned ON and OFF by movement of the bearer 58 while being connected to one end of a solenoid 86 for actuating one of the cutters disposed side by side. The other end of the solenoid 86 is connected to the other power line 108. As a result, the solenoid 86 is actuated when the secondary side switch $K_{1\text{-}1}$ and the limit switches 70 and 88 are each turned ON.

In addition, the power line 106 is also connected to one end of the secondary side switch $K_{1\text{-}2}$. The other end of this switch $K_{1\text{-}2}$ is connected to the anode of a diode 118, and its cathode is connected to one end of a capacitor 122, which forms a charger, via a resistance 120. In addition, the other end of the capacitor 122 is connected to the other power line 108 so that a half wave component rectified by the diode 118 during current supply from an AC power supply 10 is charged to the capacitor 122.

The secondary side switch $K_{1\text{-}1}$ and the limit switch 70, and the resistance 120 and the capacitor 122 are each connected via the secondary side switch $K_{1\text{-}3}$, and when the secondary side switch $K_{1\text{-}3}$ is turned ON (when the relay $K_1$ is turned OFF), power charged to the capacitor 122 will flow to the solenoid 86 on condition that the limit switches 70 and 88 are turned ON.

In addition, a resistance 126 and a switch 124 for discharging the capacitor are connected in series between the resistance 120 and the capacitor 122 and the other power line 108 respectively. Therefore, when the switch 124 is turned ON, the electric power which had been charged to the capacitor 122 is consumed by the resistance 126 for discharging. In addition, when the limit switch 70 is turned OFF, the switch 124 is turned ON.

The power lines 106 and 108 are each further extended so as to form a circuit running toward the solenoid 86 for actuating the other of the two cutters. Incidentally, since this circuit is identical to the above-mentioned one for actuating the one cutter 72, its description of the arrangement is omitted.

The operation of this embodiment is hereinafter described.

First, an ordinary procedure for treating the film is described.

First, the distal ends of the two films 40 are withdrawn from the cartridges 44 and fixed to the trailing end of the leader 46, as shown in FIG. 3. Next, after a cover 54 positioned above the film supply means 52 as seen in FIG. 4 is opened, each cartridge 44 is set onto the supporting base 58 and the leader 46 is placed on the conveying roller 66.

In this state, when operator closes the cover 54, the leader 46 is clamped between both conveying rollers 64 and 66.

Next, when the operator manipulates a predetermined start button, the conveying rollers 64 and 66 are rotated so as to transfer the leader 46 and each film 40 in the direction of the arrow in FIG. 4.

When the entire amount of film 40 is reeled out from the spools 42 within the cartridges 44 and their trailing ends are reached, the cartridges 44 and the bearer 58 are moved toward the cutter 72 against the urging force of the compression coil spring 62.

When the bearer 58 is moved forwardly to a predetermined distance, its front surface presses the contact 88A of the limit switch 88. As a result, the control unit 68 actuates the solenoid 86 to momentarily move a drive pin 84 upwardly, and the cutter 72 cuts the trailing ends of the film off the cartridges 44 (to be exact, the spools 42).

After the film 40 is completely cut, the cutter 72 is returned to the original position, as shown in FIG. 5, by the urging force of the torsion coil spring 80. Meanwhile, the cartridge 44 and the bearer 58 are also pushed back to the original position by the urging force of the compression coil spring 62.

The film 40 fed into the developing line by the film supply means 52 is immersed into tanks 14 to 26, as shown by the dashed line in FIG. 2. Briefly put, after the color developing operation is performed in tank 14, a silver image on the film 40 is bleached (repeatedly halogenated) by a bleaching solution within tank 16. Then the halogenated silver on the image surface is turned into a water-soluble silver salt by a fixing solution within tank 18.

Thereafter, the film 40 is rinsed in two stages within tanks 20 and 22 to be subjected to treatment against color change and contamination, and subsequently subjected to a treatment for stabilizing by formalizing water within tank 24 for the purpose of preventing browning of the color image. Finally, it is dried by a heater 30 and a fan 32 within tank 26 and the developed film 40, which has passed through the entire treating process, is delivered together with the leader 46 and suspended down for retention.

The foregoing is a normal developing process. The conveying system for conveying the film 40 and the leader 46, the driving system (solenoid 86) for driving the cutter 72 for cutting the trailing ends of the film 40, a power supply for actuating the heater 30 and the fan 32 and the power supply for properly heating and lagging the treating solution within each tank are all supplied from the utility AC power supply available from an electric power company. In consequence, when a blackout occurs, the power supply to all the systems is interrupted. However, if that condition is left as it is, the workmanship of the film 40, which remains within the automatic developing machine 10, is damaged. So it is necessary to manually take out the film within the developing machine. In such a case, if a handle or the like is engaged with a rectangular hole 66B provided on the shaft of the driving system for conveying the leader 46 or film 40, for example, the conveying roller 66 and is manually rotated, the chain 37 is driven and the film 40 can be sequentially taken out. However, when the trailing ends of the film 40 is not separated from the cartridges 44, it is necessary to actuate the cutter 72 provided near the position, where the cartridges 44 are charged, as well as manipulate the above-described handle. To this end, according to the present invention, the cutter 72 is supplied with power from the charger circuit 102 and, when the trailing ends of the film 40 is detected by the limit switch 88, the film is automatically cut. How the power supply is switched is hereinafter described.

As shown in FIG. 6, when the AC power supply 100 is supplied with current, since the primary side switch of the relay $K_1$ is turned ON, the secondary side switches $K_{1-1}$ and $K_{1-2}$ are turned ON. Since the secondary side switch $K_{1-3}$ is turned OFF, the solenoid 86 for actuating the cutter 72 is actuated when the limit switches 70 and 88 are simultaneously turned ON. At this time, since the secondary side switch $K_{1-2}$ is turned ON, the capacitor 122 is electrically charged. Incidentally, when secondary side switch $K_{1-3}$ and the limit switch 124 are both turned OFF, this capacitor 122 is held without being discharged.

In this case, when the cover 54 is opened during maintenance, since the limit switch 70 is turned OFF and, at the same time, the switch 124 for discharging the capacitor is turned ON, a closed loop circuit, in which the capacitor 122 and the resistance 126 are interposed, is formed. The electric power accumulated in the capacitor 122 is consumed by the resistance 126 and discharged, so that electric shock or the like cannot take place at the time of maintenance. Incidentally, an alarm means for informing the operator that discharging is under way may be used as the resistance 126 using a lamp or buzzer or the like.

When the AC power supply is interrupted due to a blackout or the like, the primary side switch of the relay $K_1$ is turned OFF. Therefore, the secondary switches $K_{1-1}$ and $K_{1-2}$ are turned OFF while the secondary side switch $K_{1-3}$ is turned ON. As a result, a circuit including the capacitor 122, limit switches 70 and 88 and the solenoid 86 is formed. When the limit switches 70 and 88 are turned ON, as indicated by arrow $I_E$ of FIG. 6, current flows to feed the solenoid 86 with current. As a result, if the film 40 is pulled out by manipulating the handle and a predetermined tension occurs, then the limit switch 88 is turned ON and the solenoid 86 is energized by the capacitor 122 so that the trailing end of the film 40 can be cut without manual operation.

According to the present invention, it is not necessary to load the developing machine with a dry-cell battery or a battery for backing up the blackout. The blackout is backed up by electrically charging the capacitor 122. Therefore, the entire apparatus is not bulky and the working space for a small-size laboratory need not be enlarged. In addition, it is not necessary to replenish the distilled water as when a battery is loaded.

In addition, since the capacitor 122 is discharged when the cover 54 is opened, the danger of electric shock is eliminated even if the operator puts his hand in the neighborhood of the capacity 122 circuit during maintenance.

Incidentally, according to the present invention, although the limit switch 70 for setting the discharge timing is turned ON and OFF by opening and closing the cover 54, it may be mounted so as to detect the opening and closing of the cover lid for the charger circuit 102 including the capacitor 122. In addition, a discharge button may be provided on the outside of the frame 12 so that discharging is manually conducted at the time of maintenance.

What is claimed is:

1. Apparatus for supplying a film for use in an automatic developing machine wherein film stored within a cartridge is withdrawn and supplied to an automatic developing machine, which, by a power supply from a power source, automatically conveys the film for processing, said apparatus comprising:

a cutter for cutting film;

means, coupled to a power supply, for actuating said cutter to cut a trailing end of the film when the trailing end of the film is detected;

a charger circuit including a capacitor electrically charged by a power supply from said power source; and means for switching the power supply provided to said actuating means from said power source to said charged capacitor when said power supply of said power source is interrupted.

2. Apparatus for supplying a film as defined in claim 1, further comprising a discharging circuit for discharging electric power charged to said capacitor and a trigger circuit for triggering said discharging circuit under a predetermined condition.

3. Apparatus for supplying a film as defined in claim 2, wherein said switching means includes means for disconnecting said power source and said actuating means and for disconnecting said power source and said charger circuit when said power supply of said power source is interrupted, and for connecting said actuating means and said charger circuit.

4. Apparatus for supplying a film as defined in claim 3, wherein said actuating means includes a solenoid for actuating the cutter when current is fed.

5. Apparatus for supplying a film as defined in claim 4, wherein said switching means comprises:

a relay coil fed with current from said power source;

a first switch coupled to said actuating means and turned OFF when the power supply from said power source to said relay coil is interrupted to disable a power supply from said power source to said actuating means;

a second switch coupled to said charger circuit and turned OFF when the power supply from said power source to said relay coil is interrupted to disable a power supply from said power source to said charger circuit; and a third switch provided between said charger circuit and said actuating means and turned ON when the power supply from said power source to said relay coil is interrupted to connect said charger circuit and said actuating means to feed current from said capacitor to said actuating means.

6. Apparatus for supplying a film as defined in claim 5, wherein said actuating means includes a fourth switch which is turned ON when the trailing end of the film is detected to enable the power supply from said charger circuit to flow to said actuating means.

7. Apparatus for supplying a film as defined in claim 6, wherein said discharging circuit includes a resistor which consumes the electric power from said capacitor.

8. Apparatus for supplying a film as defined in claim 7, further comprising a lid which is opened at least when the film stored within said cartridge is loaded, and when said cartridge are withdrawn after the film is cut, wherein said trigger circuit is triggered when said lid is opened.

9. Apparatus for supplying a film as defined in claim 8, wherein said trigger portion includes a fifth switch, said fifth switch being turned ON when said lid is open and discharging the electric power charged to said capacitor.

10. Apparatus for supplying a film as defined in claim 9, further comprising means for informing that discharging is being performed while said electric power is being consumed, said informing means being operatively coupled to said resistor.

11. Apparatus for supplying a film for use in an automatic developing machine wherein a film stored within a cartridge is withdrawn and supplied to an automatic developing machine, which, by a power supply from a power source, automatically conveys the film for processing, said apparatus comprising:

means for detecting a trailing end of the film;

means for actuating a cutter for cutting the film;

a charger circuit having a capacitor electrically charged by a power supply from said power source;

means for conducting current from said power supply of said power source to said actuating means, said conducting means being coupled to said detecting means; and means for switching a power supply provided to said conducting means from that of said power source to that of said charger circuit when said power supply of said power source is interrupted.

12. Apparatus for supplying a film as defined in claim 11, further comprising a discharging circuit for electrically discharging electric power charged to the capacitor of said charger circuit and a trigger circuit for triggering said discharging circuit under a predetermined condition.

13. Apparatus for supplying a film as defined in claim 11, wherein said switching means includes means for disconnecting said power source and said conducting means and for connecting said conducting means and said charger circuit when said power supply of said power source is interrupted.

14. Apparatus for supplying a film as defined in claim 13, wherein said actuating means includes a solenoid for actuating the cutter with the power supply.

15. Apparatus for supplying a film as defined in claim 14, wherein said switching means comprising:

a relay coil fed with current from said power source;

a first switch coupled to said conducting means and turned OFF when the power supply from said power source to said relay coil is interrupted to disable the power supply from said power source to said conducting means;

a second switch coupled to said charger circuit and turned OFF when the power supply from said power source to said relay coil is interrupted to disable the power supply from said power source to said charger circuit; and a third switch provided between said charger circuit and said conducting means and turned ON when the power supply from said power source to said relay coil is interrupted to connect said charger circuit and said conducting means to feed current from said capacitor to said conducting means.

16. Apparatus for supplying a film as defined in claim 15, wherein said conducting means includes a fourth switch turned ON when the trailing end of the film is detected by said detecting means to enable the power supply to flow from one of said power source and said charger circuit to said conducting means.

17. Apparatus for supplying a film as defined in claim 12, wherein said discharging circuit includes a resistor which consumes the electric power from said capacitor.

18. Apparatus for supplying a film as defined in claim 17, further comprising a lid which is opened at least when the film stored within said cartridge is charged and when said cartridge is withdrawn after the film is cut, said apparatus further comprising means for actuating said trigger circuit when said lid is opened.

19. Apparatus for supplying a film as defined in claim 18, wherein said trigger circuit includes a fifth switch turned ON by opening said lid thereby to discharge the electric power charged to said capacitor.

20. Apparatus for supplying a film as defined in claim 17, further comprising means for informing, while said electric power is being consumed, that said capacitor is being discharged, said informing means being operatively coupled to said resistor.

* * * * *